June 15, 1954 M. F. GRUNWALD 2,681,201
TACKLE BOX AND FIXTURE THEREFOR
Filed May 5, 1950 2 Sheets-Sheet 1
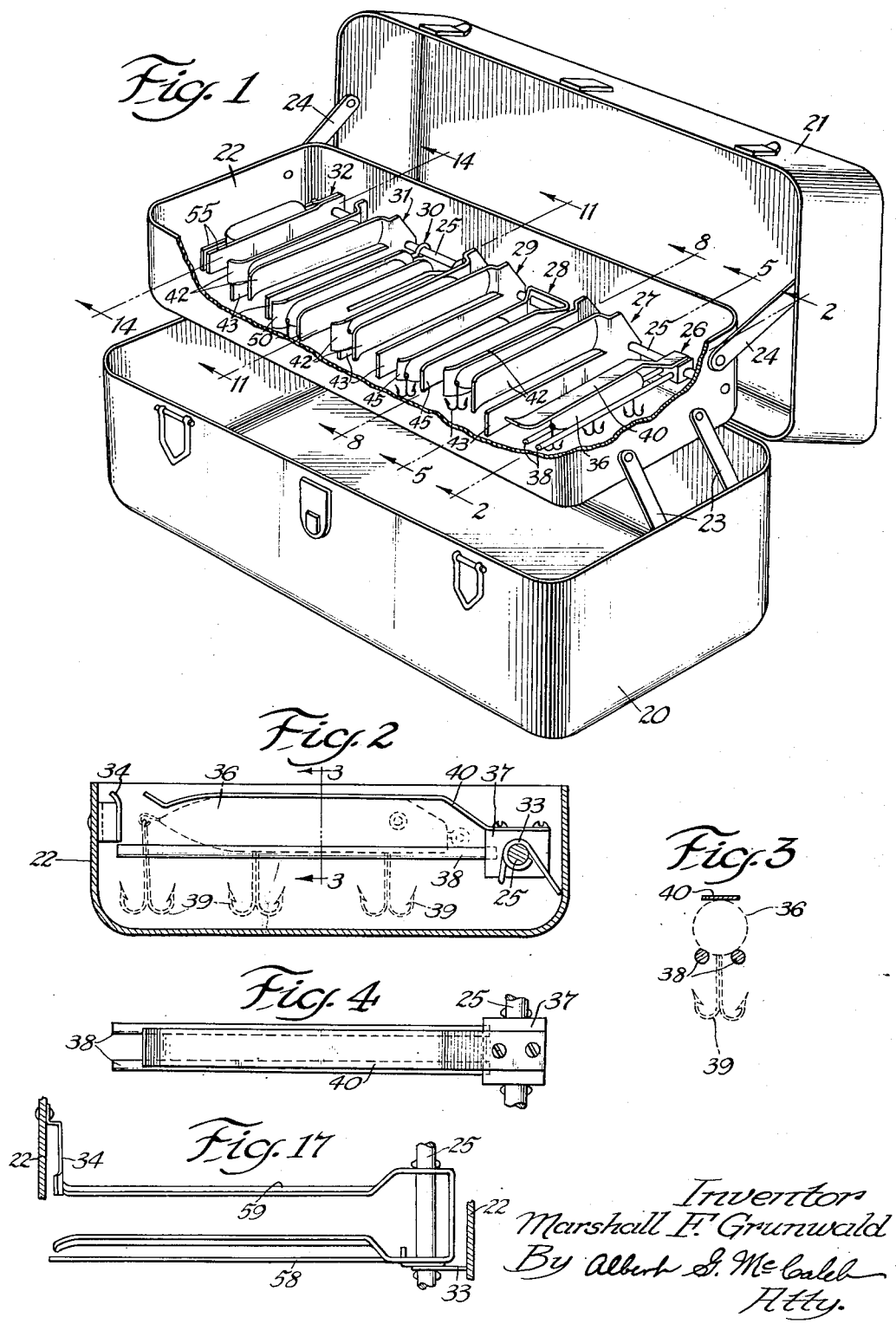

June 15, 1954   M. F. GRUNWALD   2,681,201
TACKLE BOX AND FIXTURE THEREFOR
Filed May 5, 1950   2 Sheets-Sheet 2
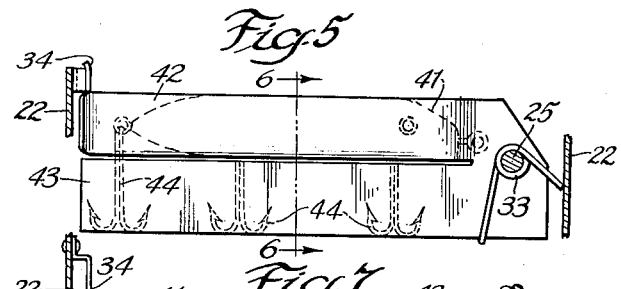
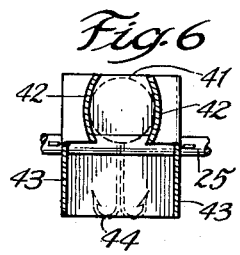
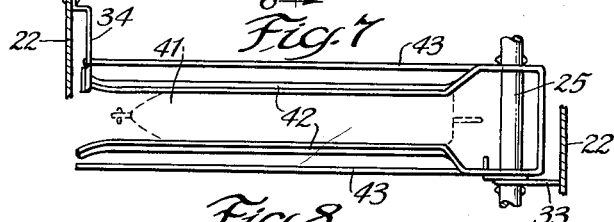
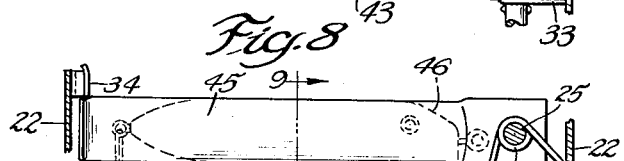
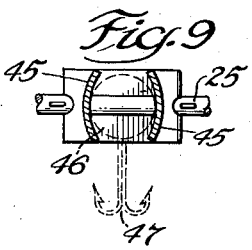
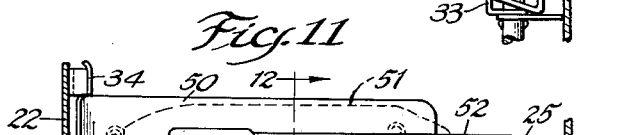
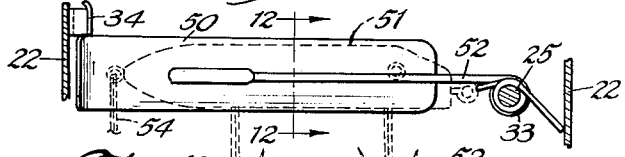
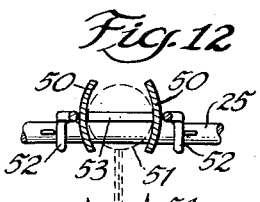
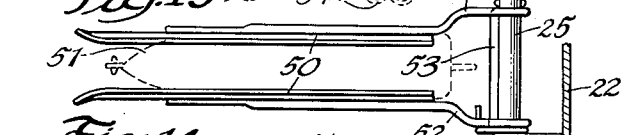
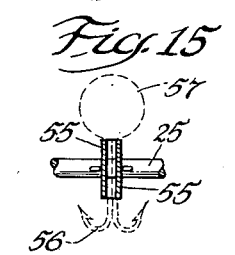
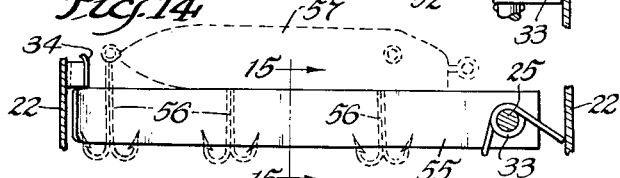
Inventor
Marshall F. Grunwald
By Albert G. McCaleb
Atty.

Patented June 15, 1954

2,681,201

UNITED STATES PATENT OFFICE 2,681,201

TACKLE BOX AND FIXTURE THEREFOR

Marshall F. Grunwald, Elmhurst, Ill.

Application May 5, 1950, Serial No. 160,330

1 Claim. (Cl. 248—316)

This invention relates to tackle boxes and fixtures, and it has for its object the provision of a new and improved form and arrangement of parts by the use of which a fisherman is enabled to carry a substantial supply of artificial lures of various types and sizes so as to have any selected one of them conveniently and rapidly available for use.

It is a principal object of my invention to provide an improved form of fixture for use in a tackle box, which fixture shall be adapted to have a resilient grip on the body or on the hook members of a plug or lure so as to hold it removably in position. For attaining this object, I have provided a plurality of arms movably mounted alongside of each other, with at least one of said arms pressing yieldingly toward an oppositely disposed arm so as to apply pressure on a suitable portion of an interposed lure for gripping the lure. In one preferred form of my improved device, I have provided two oppositely disposed resilient gripping arms which are adapted by pressure on opposite sides of the lure to hold the lure releasably in position. In another preferred form, the lure is pressed by a single yieldingly acting arm toward two spaced comparatively rigid arms for holding the lure in position. In still another form, two resilient arms are oppositely disposed with respect to each other so as to press on opposite faces of the shanks of hooks forming parts of a lure so as thus to hold the lure in position.

It is one of the objects of my invention to provide a container equipped with a plurality of lure supporting fixtures and cooperating means in which each of the fixtures is mounted so as to swing vertically with respect to the container for movement upwardly for access to the fixture for insertion of a lure therein, or for movement downwardly out of the way so as to afford access to the adjacent fixtures. In this arrangement, I have provided yielding means for causing the fixture to swing upwardly and latch means for holding the fixture releasably in lowered position.

It is another object of my invention to provide improved means in connection with fixtures of this type for keeping the hooks of lures supported by adjacent fixtures effectively separated from each other, both when the lures are in position in the fixtures and when such lures are being placed in the fixture or being removed therefrom. It is one of my objects to provide effective means for this purpose in the form of shields of sheet metal produced as integral parts of the fixtures, being produced preferably in the form of arms parallel with the gripping arms but at a lower level.

Other objects and advantages will be apparent also from the following description of an exemplary embodiment of my invention disclosed for illustrative purposes by reference to the accompanying two sheets of drawings, in which:

Fig. 1 is a perspective view of an embodiment of my invention, with a part of the supporting tray broken away for clearness of illustration;

Fig. 2 is a vertical cross sectional view through the tray, being taken substantially at the line 2—2 of Fig. 1;

Fig. 3 is a vertical sectional view taken substantially at the line 3—3 of Fig. 2;

Fig. 4 is a top plan view of the arrangement shown in Fig. 2 but with certain of the parts omitted;

Fig. 5 is a vertical sectional view taken substantially at the line 5—5 of Fig. 1;

Fig. 6 is a vertical sectional view taken substantially at the line 6—6 of Fig. 5;

Fig. 7 is a top plan view of the parts shown in Fig. 5;

Fig. 8 is a vertical sectional view taken substantially at the line 8—8 of Fig. 1;

Fig. 9 is a vertical sectional view taken substantially at the line 9—9 of Fig. 8;

Fig. 10 is a top plan view of the parts shown in Fig. 8 but with certain of the parts omitted;

Fig. 11 is a vertical sectional view taken substantially at the line 11—11 of Fig. 1;

Fig. 12 is a vertical sectional view taken substantially at the line 12—12 in Fig. 11;

Fig. 13 is a top plan view of the construction shown in Fig. 11 but with certain of the parts omitted;

Fig. 14 is a vertical sectional view taken substantially at the line 14—14 of Fig. 1;

Fig. 15 is a vertical sectional view taken substantially at the line 15—15 of Fig. 14;

Fig. 16 is a top plan view of the construction shown in Fig. 14, but with certain of the parts omitted; and Fig. 17 is a view similar to Fig. 7 but showing a modified form of fixture.

Referring now particularly to Fig. 1 of the drawings, 20 indicates a base member for supporting a plurality of lures, being arranged in the form of a sheet metal box having a lid portion 21 hingedly mounted thereon, said lid portion 21 being provided preferably with a suitable handle not shown for enabling a fisherman conveniently to carry the box in substantially balanced position. Within the box there is a sheet metal container 22 movably supported in position by two pivotally mounted links 23 at each end of the box. Links 24 pivotally connected with the lid 21 and the container 22 at opposite ends of the box serve to cause the container to be raised into elevated position above the box 20 when the lid 21 is swung to its open position as shown in Fig. 1, the container being adapted to move downwardly into position to be covered by the lid 21 when the lid is lowered to its closing position.

Within the container 22 longitudinally thereof, I have provided a supporting shaft 25 having a series of fixtures 26, 27, 28, 29, 30, 31 and 32 pivotally mounted thereon so as to be free to swing upwardly and downwardly on a horizontal axis independently of each other. Each of said fixtures is provided with a coiled spring 33 mounted on the shaft 25 and bearing at its end portions on the fixture and on the container so as normally to hold the fixture in elevated and oblique position with respect to the container so as to afford ready and convenient access to the free end of the fixture. A series of latch devices 34, each comprising a flat spring mounted in suitable position on the front wall of the container 22, serve to hold the fixtures releasably in their normal horizontal positions against the action of the springs 33. The arrangement is such that when one of said fixtures is pushed downwardly it automatically engages the adjacent spring latch member 34 which then holds the fixture releasably in its lowered position. When the spring latch 34 of any one of the fixtures is pressed toward the front wall of the container 22, such fixture is promptly moved upwardly by its spring 33 about the shaft 25 into oblique raised position at a higher level than the adjacent fixtures.

In Figs. 2, 3 and 4, I have shown one form of my improved fixture with a lure or plug 36 of any approved type shown diagrammatically by dotted lines in position on the fixture. In this arrangement, corresponding substantially to the fixture 26 as shown at the extreme right in Fig. 1, a block 37 is mounted loosely on the shaft 25, having two comparatively long straight bars or arms 38 mounted in spaced parallel relationship to each other in its front face so as to support the body of the lure 36 thereon, with the shanks of the hooks 39 on the lure extending downwardly between said bars 38. A resilient arm 40 mounted on the top face of the block 37 serves to press the body of the lure 36 downwardly against the bars 38 for supporting the lure slidably in position on the bars.

As will be readily understood, when the fixture is held by its spring 33 in its raised oblique position on the shaft 25, the lure or plug 36 is adapted to be slid quickly and easily out of engagement with the bars 38 and the resilient arm 40; the adjacent fixtures being preferably held in their lowered positions by the latch devices 34 for permitting such operation to be carried out to advantage. When it is desired to insert a lure in position on the fixture, this operation also can be very readily effected, the spring arm 40 being adapted to yield upwardly upon the application of a slight pressure thereon for permitting this result to be easily effected.

In the arrangement shown in Figs. 5, 6 and 7, illustrating a preferred form of my improved fixture for supporting a lure 41, pressure arms 42 are provided in laterally spaced relationship alongside of each other on the shaft 25 in position to apply pressure on the opposite side faces of the body of the lure, each of said arms being concaved at its pressure face for partially surrounding and gripping the lure 41. A coiled spring 33, as above described, serves normally to hold the fixture comprising said arms 42 in raised position with respect to the container 22, one of the spring latch members 34 as above described being adapted to hold the fixture releasably in its lower position. Below the gripping arms 42, I have provided other arms 43 in outwardly spaced relationship to the arms 42 in position to shield the hooks 44 carried by said lure 41 and also to keep such hooks 44 effectively separated from the hooks 39 of the adjacent lure 36.

In the arrangement here illustrated, the arms 42 and the arms 43 are all formed from a single piece of resilient sheet metal cut and bent into shape as best shown in Fig. 7. The arms 42 are in such relationship to each other as to hold the lure 41 effectively in position by yielding pressure thereon. At the same time, the spacing is such as to permit quick and easy insertion of the lure into supported position on the fixture or removal of the lure from engagement with the fixture. The fixture as here shown corresponds substantially to the fixtures 27, 29 and 31 as illustrated in Fig. 1.

The fixture as shown in Figs. 8, 9 and 10 corresponds substantially to the fixture 28 as shown in Fig. 1. In this embodiment, resilient gripping arms 45 are employed in laterally spaced relationship side by side on the shaft 25 for supporting a plug or lure 46 provided with hooks 47. The arms 45 are concaved at their pressure faces for attaining the desired grip on the body of the lure, such arms being formed integrally with each other from a single strip of resilient sheet metal cut and bent into shape as best shown in Fig. 10. This arrangement also is provided with a spring 33 adapted normally to hold the fixture in raised oblique position on the shaft 25 and with a spring latch 34 for holding the fixture releasably in its lowered position against the action of the spring 33. In the arrangement shown in Fig. 1, the hooks 47 of the lure 46 are effectively separated by the shielding arms 43 of the adjacent fixtures from the hooks of the lures carried by the fixtures 27 and 29.

In the construction illustrated in Figs. 11, 12 and 13, corresponding substantially to the fixture 30 as shown in Fig. 1, gripping arms 50 engage opposite side faces of the body of the lure 51, such arms 50 being concaved at their pressure faces. In this arrangement, the arms 50 are mounted on the shaft 25 by means of resilient bars 52 which are looped about the shaft 25 and are connected with each other by an integral connecting portion 53. The coiled spring 33 normally holds the fixture in raised position with respect to the shaft 25 and the spring latch 34 holds the fixture releasably in its lowered position. The hooks 54 carried by the lure 51 are protected from the hooks of the adjacent fixtures by the shielding arms 43 of such adjacent fixtures.

The construction illustrated in Figs. 14, 15 and 16 is different in that in such construction the gripping arms 55 apply yielding pressure on the side faces of the shanks of the hooks 56 carried by the lure 57 rather than on the side faces of the body of the lure. Such arms 55 are formed from a single strip of resilient metal bent upon itself to provide the two arms in slightly spaced relationship to each other. The fixture is normally held in raised position about the shaft 25 by the coiled spring 33, as in the other constructions described, and is held releasably in its lowered position by the spring latch 34 mounted on the front wall of the container 22. While the spring arms 55 engage the body of this lure only at their upper edges, it will be understood that such body of the lure 57 should be held normally in position directly above the spring arms by reason of the frictional engagement of the arms with the shanks of the hooks 56.

In the arrangement illustrated in Fig. 17, I have shown a construction substantially substantially like that shown in Fig. 7, except that in the arrangement of said Fig. 17 there is only one shielding arm 58 alongside of the gripping arms 59 instead of two such arms. In this arrangement, the arms 58 and 59 are formed from a single strip of resilient sheet metal, with the arm 58 positioned at a lower level than that of the arm 59 and in laterally spaced relationship with respect to said arm. The arms 59 are concaved at their pressure faces in the construction illustrated. A coiled spring 33 as above explained normally holds the fixture in raised oblique position, and a spring latch 34 is adapted to hold the fixture in a lowered position against the action of the spring 33.

When a fixture as shown in Figs. 5, 6 and 7 is used, such form of fixture is preferably alternated with other forms of fixture not provided with the shielding arms 43, such arrangement being shown in Fig. 1 as above described. When, however, the form of fixture is employed as shown in Fig. 17, each of the several fixtures in turn on the shaft 25 may be of that same form, since in that way a shielding arm 59 is provided between each two adjacent fixtures in position for protecting the hooks of each of the several supported lures from the hooks of the other lures.

While I have illustrated a preferred embodiment of my invention, modifications of such embodiment may be made without departing from the spirit of the invention, and I do not wish to be limited to the precise details of construction set forth, but desire to avail myself of all changes within the scope of the appended claim.

Having thus illustrated and described a preferred embodiment of my invention, what I claim as new and desire to secure by Letters Patent of the United States is:

A fixture for carrying a fishing lure relative to a support and comprising, in combination, substantially parallel lure gripping arms connected together at one end and extending from that end in spaced relationship, means providing a hinge connection at said one end of the arms for securing the arms to the support for swinging movement between storage and exposed positions, said means including a rod extending laterally of the connected ends of the arms, spring means for biasing the arms toward one of the positions, said spring means comprising a resilient wire having a coil portion encompassing the rod and extending end portions engaging the support and one of said arms, and latch means engageable with the free end of one of the arms for holding said arms in the other position.

References Cited in the file of this patent

UNITED STATES PATENTS

| Number | Name | Date |
| --- | --- | --- |
| 340,116 | Hinman | Apr. 20, 1886 |
| 471,858 | Hamlin | Mar. 29, 1892 |
| 526,900 | Kuhlmann | June 30, 1896 |
| 825,332 | Mack | July 10, 1906 |
| 1,010,057 | Kaeber | Nov. 28, 1911 |
| 1,248,843 | Gay | Dec. 4, 1917 |
| 1,372,552 | Roberts | Mar. 22, 1921 |
| 1,441,230 | Legge | Jan. 9, 1923 |
| 1,713,704 | Lobel | May 21, 1929 |
| 1,718,316 | Swenson | June 25, 1929 |
| 1,883,134 | Walker et al. | Oct. 18, 1932 |
| 2,045,023 | Reid | June 23, 1936 |
| 2,051,408 | Korst | Aug. 18, 1936 |
| 2,069,661 | Tiede | Feb. 2, 1937 |
| 2,161,719 | Minyard | June 6, 1939 |
| 2,220,817 | Holmes | Nov. 5, 1940 |
| 2,310,156 | Van der Clute | Feb. 2, 1943 |

FOREIGN PATENTS

| Number | Country | Date |
| --- | --- | --- |
| 225,941 | Switzerland | Mar. 15, 1943 |
| 430,470 | Great Britain | June 19, 1935 |